United States Patent [19]
Nakaki

[11] Patent Number: 5,586,110
[45] Date of Patent: Dec. 17, 1996

[54] OPTICAL/MAGNETO-OPTICAL RECORDING MEDIUM HAVING A HYGROSCOPIC SWELLING LAYER

[75] Inventor: Yoshiyuki Nakaki, Amagasaki, Japan

[73] Assignee: Mitsubishi Denki Kabushiki Kaisha, Tokyo, Japan

[21] Appl. No.: 363,596

[22] Filed: Dec. 23, 1994

Related U.S. Application Data

[63] Continuation of Ser. No. 939,553, Sep. 1, 1992, abandoned, which is a continuation of Ser. No. 485,255, Feb. 26, 1990, abandoned.

[30] Foreign Application Priority Data

Feb. 27, 1989 [JP] Japan ................................. 1-43326

[51] Int. Cl.⁶ ....................................... G11B 7/24
[52] U.S. Cl. ................... 369/286; 369/284; 428/64.7
[58] Field of Search ..................... 369/280, 282, 369/283, 284, 286, 275.5; 346/135.1; 428/64.1–64.7, 694 R, 694 MC, 694 SC, 694 MT, 694 RE

[56] References Cited

U.S. PATENT DOCUMENTS

| | | | |
|---|---|---|---|
| 4,450,553 | 5/1984 | Holster et al. | 369/286 |
| 4,639,745 | 1/1987 | Matsui et al. | 346/135.1 |
| 4,650,742 | 3/1987 | Goto et al. | 346/135.1 X |
| 4,704,650 | 11/1987 | Yamamoto | 369/280 |
| 4,710,899 | 12/1987 | Young et al. | 369/283 |
| 4,711,816 | 12/1987 | Wittnebel | 346/135.1 X |
| 4,725,502 | 2/1988 | Kiyomiya et al. | 346/135.1 X |
| 4,740,947 | 4/1988 | Ohta et al. | 346/135.1 X |
| 4,806,952 | 2/1989 | Nashida et al. | 346/135.1 X |
| 4,809,022 | 2/1989 | Wilkinson et al. | 346/135.1 |
| 4,831,608 | 5/1989 | Tsukane et al. | 369/288 |
| 4,852,077 | 7/1989 | Clark et al. | 346/135.1 X |
| 4,871,601 | 10/1989 | Miura et al. | 428/64 |
| 4,889,757 | 12/1989 | Horigome et al. | 428/64 |
| 4,915,997 | 4/1990 | Yamamuro et al. | 369/284 X |
| 4,942,073 | 7/1990 | Era et al. | 369/284 X |
| 4,972,402 | 11/1990 | Miura et al. | 369/275.1 |
| 4,984,231 | 1/1991 | Yasuoka et al. | 346/135.1 X |
| 5,224,090 | 6/1993 | Umeda et al. | 369/284 |

FOREIGN PATENT DOCUMENTS

| | | | |
|---|---|---|---|
| 58-175150 | 10/1983 | Japan | 369/283 |
| 0236133 | 11/1985 | Japan | 369/284 |
| 61-63944 | 4/1986 | Japan | 369/284 |

OTHER PUBLICATIONS

F. Kurosawa et al., "Deflection In One Side Recordable Magneto–Optical Disks With Polycarbonate Substrates Induced By Humidity Changes", Proceedings of Magneto–Optical Recording Int'l Symposium '91, J. Magn.Soc.Jpn., vol. 15, Supplement No. S1 (1991), pp. 409–412.

Y. Nakaki et al., "Tilt of Magneto–Optical Memory Disk using Polycarbonate Substrate", Extended Abstracts (The 35th Spring Meeting, 1988); The Japan Society of Applied Physics and Related Societies, p. 872, (1988).

Sokushima, "Thin Film Handbook", pp. 879–882, Dec. 10, 1983.

Kanno et al., "Copolycarbonates for Magneto–Optical Disk", in Electrotechnical Society Research Material MAG–88–197–203, pp. 39–46, Nov. 24, 1988.

(List continued on next page.)

*Primary Examiner*—Stuart S. Levy
*Assistant Examiner*—Paul J. Ditmyer
*Attorney, Agent, or Firm*—Wolf, Greenfield & Sacks, P.C.

[57] ABSTRACT

An information recording medium comprising a hygroscopic swelling layer having the hygroscopic swelling property formed on a recording layer. Also the hygroscopic swelling layer is hygroscopically swollen with the hygroscopic swelling of the substrate, so that the tilt (i.e. warping) of the information recording medium is suppressed as a whole, whereby the quantity of the tilted deformation due to the moisture absorption is reduced. As a result, the recording and regeneration of information are stably conducted even though the humidity is changed.

28 Claims, 2 Drawing Sheets

OTHER PUBLICATIONS

Karaiwa et al., "APO Substrate for Optical Disk", Electrotechnical Society Research Material, MAG-91-20-26, pp. 1-8, Jan. 18, 1991.

Yano, "Absorption of Gas", Experimental Chemistry Lecture 8, Polymer Chemistry, vol. 2, pp. 138-145, eds. Japanese Chemistry Society, Jan. 20, 1957.

Kobukata et al., "High performance φ 3.5 inch magneto-optical memory disk", Optical Memory Symposium '88, pp. 19-20, Sep. 19-21 1988.

Hennig, J., "Polymer Substrates for Optical Disks," Proc. Int. Symp. on Optical Memory, 1987, pp. 9-14.

Vchiyama et al., "Substrate Material" in Research Report II of Mass Storage & High Density Memory Material, pp. 64-81 (Japanese Electronic Industry Promotion Association), Mar. 1990.

Tachikawa et al., "Water Absorption and Size Stability", Plastic Material Lecture 17, Polycarbonate, pp. 72-73 (Daily Industry Newspaper Corporation), Dec. 10, 1983.

OPTICAL/MAGNETO-OPTICAL RECORDING MEDIUM HAVING A HYGROSCOPIC SWELLING LAYER

This application is a continuation of application Ser. No. 07/939,553, filed Sep. 1, 1992 now abandoned, which is a continuation of Ser. No. 07/485,255 filed Feb. 26, 1990, now abandoned.

BACKGROUND OF THE INVENTION

1. Field of the Invention

The present invention related to an information recording medium for recording and regenerating informations therein such as magneto-optical disk and optical disk.

2. Description of Related Art

In order to stably regenerate information for a long time in an information recording medium, it is necessary to stably keep the information. However, if an information recording medium using a hygroscopic substrate, such as a plastic substrate, is placed under a high-humidity condition, the substrate is hygroscopically swollen by the hygroscopic action thereof to be tilted as a whole, i.e. warped, or thereby leading to errors and the like in the recording and regeneration, and thus the reliability of information is missing. Accordingly, such an information recording medium has been provided with a protective layer having the humidity resistance, i.e., little or no water absorptivity in order to prevent the hygroscopic behavior of the substrate.

FIG. 1 is a sectional view showing principle parts of the conventional magneto-optical disk belonging to the same kind as that disclosed in, for example, Japanese Patent Application Laid-Open No. 60-115037 (1985). Referring to FIG. 1, a first protective layer 2 made of SiNx is formed on one side of a light-transmitting plastic substrate 1 made of polycarbonate resin. A recording layer 3 made of a TbFeCo magnetic layer is formed on the first protective layer 2. A second protective layer 4 made of the same material as that of the first protective layer 2 is formed on the recording layer 3. A light-transmitting third protective layer 5 made of ultraviolet ray-setting resin is formed on the other side of the plastic substrate 1. A laminated member comprising the plastic substrate 1, the first-, second- and third protective layers 2, 4, 5 and the recording layer 3 is provided with a humidity resisting sealing member 6 made of ultraviolet ray-setting resin at an end portion thereof.

With such a magneto-optical disk, the first-, second- and third protective layers 2, 4, 5 and the humidity resisting sealing member 6 prevent moisture from entering the plastic substrate 1, thereby eliminating the hygroscopic action of the plastic substrate 1.

The conventional magneto-optical disk having the above described construction is provided with the respective protective layers 2, 4, 5 and the like but it is difficult to reduce the moisture permeability thereof to zero, so that the plastic substrate 1 is unavoidably hygroscopic to be swollen under a high-humidity condition. On the contrary, problems have occurred in that the respective protective layers 2, 4, 5 do not readily expand, whereby the magneto-optical disk is tilted as a whole (warped) due to differences between the respective layers in expansion coefficient or swelling rate.

In addition, problems have occurred also in that once moisture is absorbed by the plastic substrate 1, the moisture is kept in the plastic substrate 1 for a long time in the opposite way due to the respective protective layers 2, 4, 5, whereby not only a time, when the magneto-optical disk is tilted as a whole, is increased but also the recording layer 3 is oxidized and corroded.

SUMMARY OF THE INVENTION

The present invention has been achieved for solving the above described problems. The information recording medium according to the present invention comprises a hygroscopic swelling layer having the hygroscopic swelling property (i.e. having a certain water absorptivity and swelling rate equal to that of the substrate) formed on a recording layer formed on a substrate. When the substrate absorbs moisture and is swollen, the hygroscopic swelling layer absorbs moisture and is swollen as well, so that warping is prevented.

The hygroscopic swelling layer may be formed on merely one side of the substrate or both sides of the substrate. In addition, it is preferable that the recording layer is sandwiched in the protective layers having the humidity resistance.

The hygroscopic swelling layer can be made of thermosetting resin, such as polycarbonate resin and ultraviolet ray-setting resin, thermoplastic resin and the like.

It is one object of the present invention to provide an information recording medium capable of reducing the tilted deformation due to hygroscopic behavior.

It is another object of the present invention to provide an information recording medium capable of stably recording and regenerating information even through humidity in an atmosphere is changed.

It is a further object of the present invention to provide an information recording medium capable of preventing the deterioration of the recording layer.

It is a still further object of the present invention to provide an information recording medium capable of achieving a better effect by making a hygroscopic swelling layer of the same material as that of the substrate.

The above and further objects and features of the invention will more fully be apparent from the following detailed description with accompanying drawings.

DESCRIPTION OF THE PREFERRED EMBODIMENTS

The present invention will be below described in detail with reference to the drawings showing the preferred embodiments thereof.

Figure 1:
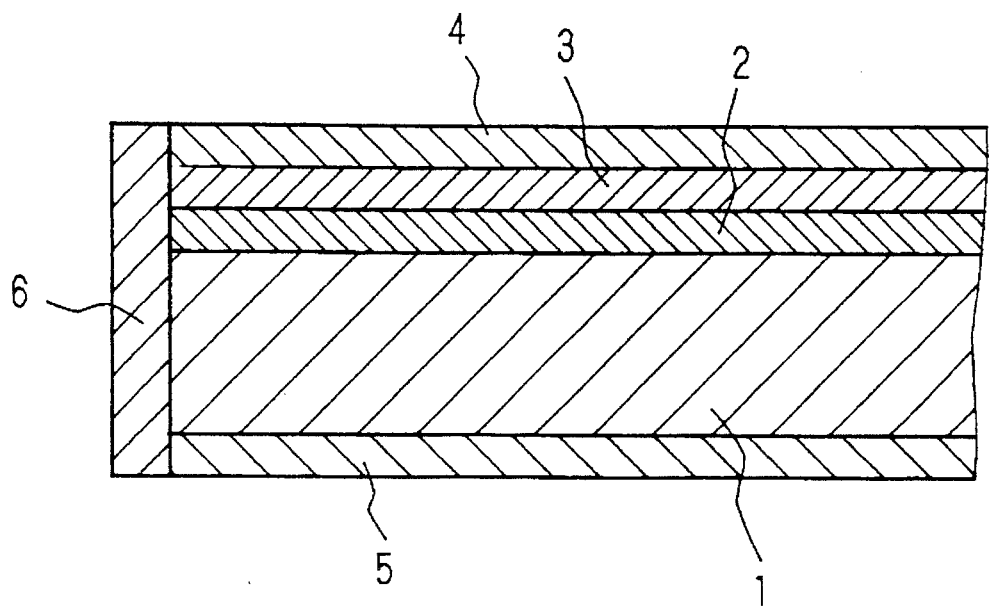
FIG. 1 is a sectional view showing principle parts of the conventional magneto-optical disk.
Figure 2:
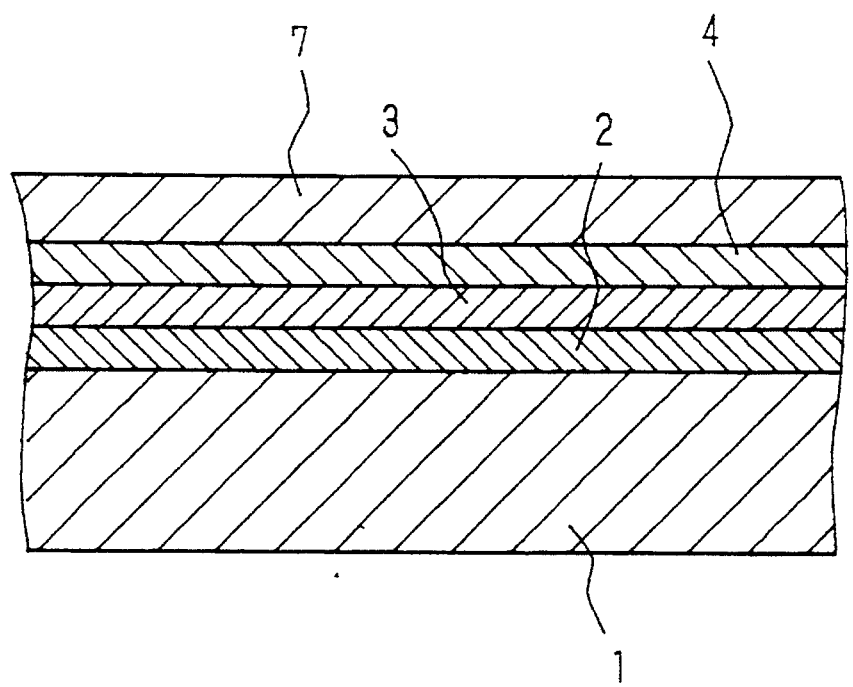
FIG. 2 is a sectional view showing principle parts of a magneto-optical disk according to one preferred embodiment of the present invention.

FIG. 2 is a sectional view showing principal parts of a magneto-optical disk according to a first preferred embodiment of the present invention. Referring to FIG. 2, reference numeral 1 designates a light-transmitting plastic substrate made of polycarbonate resin. A first protective layer 2 which has the humidity resistance and is made of SiNx is formed on the plastic substrate 1, and a recording layer 3 made of a TbFeCo magnetic layer is formed on the first protective layer 2. A second protective layer 4 made of the same material as that of the first protective layer 2 is formed on the recording layer 3 and a hygroscopic swelling layer 7 is formed on the second protective layer 4 through adhesives (not shown). The hygroscopic swelling layer 7 is made of the same polycarbonate resin as that of the plastic substrate 1.

Upon exposing the magneto-optical disk having the above described construction to high humidity, the plastic substrate 1 is hygroscopically swollen but also the hygroscopic swelling layer 7 is swollen. Accordingly, the expansion of the plastic substrate 1 is compensated by the expansion of the hygroscopic swelling layer 7 and thus the quantity of the tilted deformation of the disk is reduced as a whole.

In addition, moisture, which has been once absorbed, is dehumidified at almost the same speed as that when absorbed without being hindered by the protective layers 2, 4, so that the recording layer 3 is not deteriorated.

Figure 3:
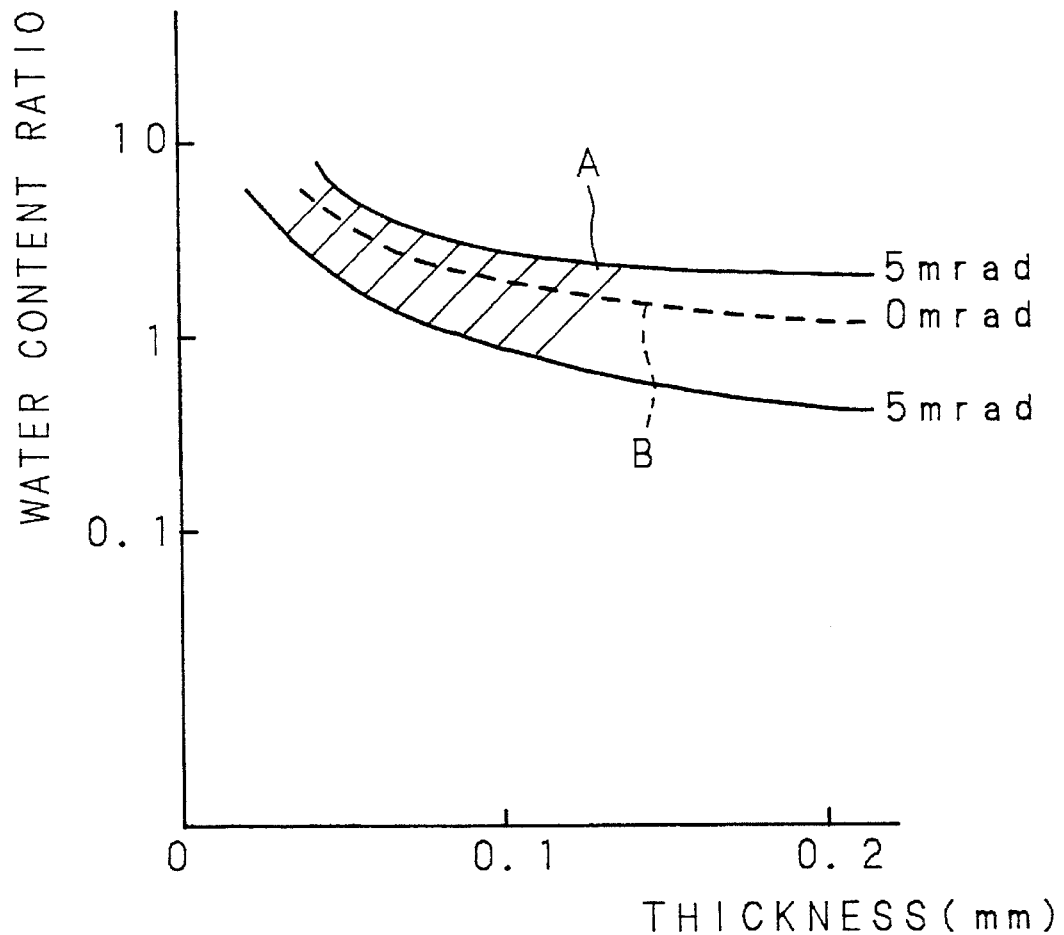
FIG. 3 is a graph showing a relation between a ratio of the water content of a hygroscopic swelling layer to a plastic substrate, a thickness of the hygroscopic swelling layer and a quantity of the tilted deformation of a magneto-optical disk.

FIG. 3 is a characteristic diagram showing a relation between the ratio of water content of the hygroscopic swelling layer 7 to the plastic substrate 1, the thickness of the hygroscopic swelling layer 7 and the quantity of the tilted deformation of the magneto-optical disk. Referring to FIG. 3, the abscissa axis indicates the thickness (mm) of the hygroscopic swelling layer 7 and the ordinate axis indicates a ratio of the water content of the hygroscopic swelling layer 7 to the plastic substrate 1. However, a diffusion coefficient of moisture and the expansion coefficient of the hygroscopic swelling layer 7 are selected at the same values as those of the plastic substrate 1 and a doughnut disk having a thickness of 1.2 mm and a diameter of 3.5 inches is used as the plastic substrate 1.

In FIG. 3, the maximum value of the quantity of the tilted deformation of the magneto-optical disk is suppressed at 5 mrad (milliradian) or less in a zone A positioned between two full lines. In addition, a condition that the tilted deformation due to the absorption of moisture and dehumidification is hardly brought about is achieved in a zone on a broken line B in FIG. 3. If the thickness and water content of the hygroscopic swelling layer 7 are set at the conditions within such a zone, remarkably superior characteristics against the tilting can be achieved.

Next, according to the second preferred embodiment, the hygroscopic swelling layer made of ultraviolet ray-setting resin is used. A relation between the maximum value of the change of the tilted deformation and the film thickness of the hygroscopic swelling layer when the atmospheric condition is changed from 31° C. 90% relative humidity to 25° C., 50% relative humidity is shown in the following Table. However, the same substrate and recording layer as those in the first preferred embodiment are used and the ultraviolet ray-setting resin is applied by the spin coating method and set.

| Film Thickness (mm) | Maximum Value of the Quantity of the Tilted Deformation (mrad) |
| --- | --- |
| 0.0 | 10 |
| 0.1 | 5 |
| 0.2 | 2 |

In the magneto-optical disk provided with the hygroscopic swelling layer made of ultraviolet ray-setting resin in such a manner, the quantity of the tilted deformation is reduced in comparison with that of the magneto-optical disk, which is not provided with the hygroscopic swelling layer, in the same manner as in the first preferred embodiment. In addition, in both the first preferred embodiment and the second embodiment the reduction of the C/N ratio due to the formation of the hygroscopic swelling layer is not observed.

Figure 4:
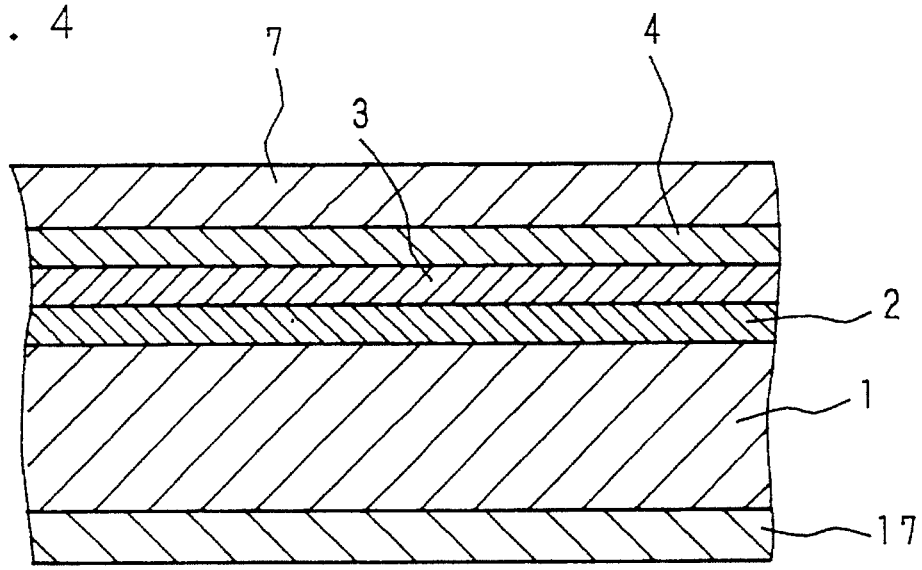
FIG. 4 is a sectional view showing principle parts of a magneto-optical disk according to another preferred embodiment of the present invention.

FIG. 4 is a sectional view showing principle parts of the magneto-optical disk according to a third preferred embodiment. The parts, which are the same as or correspond to those in FIG. 2, are designated by the same reference numerals as those in FIG. 2, so that their description is omitted. In the first and second preferred embodiments the hygroscopic swelling layer 7 is formed on merely one side of the plastic substrate 1 but in this third preferred embodiment hygroscopic swelling layers 7, 17 are, respectively, formed on both sides of the information recording medium. In this case, it is required that the hygroscopic swelling layer 17, which is formed on a lower side of the plastic substrate 1 has not only the hygroscopic swelling property but also the capability of transmitting light (i.e. it is translucent) during the recording and regeneration.

In addition, although the hygroscopic swelling layer is made of polycarbonate resin and ultraviolet ray-setting resin in the above described preferred embodiments, other thermosetting resin, thermoplastic resin and the like may be used. Every material having the hygroscopic swelling property and not reducing the C/N ratio may be used in addition to resins.

In addition, although the hygroscopic swelling layer is formed by adhering the polycarbonate resin by means of adhesives or applying and setting the ultraviolet ray-setting resin by the spin coating method in the above described preferred embodiments, also other methods may be used.

Furthermore, although the magneto-optical disk is shown as the information recording medium in the above described preferred embodiments, it may be for example an optical disk or information recording media having other shapes such as card-like shape.

Moreover, although the plastic substrate 1 made of polycarbonate resin is shown as the substrate in the above described preferred embodiments, every substrate having the hygroscopic swelling property can be used even though it is made of other plastics or materials other than plastics. In addition, also the material of the recording layer 3 is not specially limited.

In addition, although the plastic substrate 1, the recording layer 3 and the hygroscopic swelling layer 7 are laminated through the first- and second protective layers 2, 4 and the adhesive layer in the above described preferred embodiments, they may be directly laminated or laminated through other layers such as a reflective layer.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. An information recording medium, wherein the information recording medium has a single recording layer, comprising:

a substrate having a first water absorptivity, a first thickness and a first swelling rate;

a first protective layer formed on said substrate and having a second water absorptivity such that the first protective layer is substantially resistant to absorption;

wherein the single recording layer is a re-writable recording layer formed on said first protective layer for recording information and including a rare-earth transition metal and capable of corrosion when in contact with moisture;

a second protective layer formed on said recording layer and having a third water absorptivity such that the second protective layer is substantially resistant to absorption; and a hygroscopic swelling layer formed on said second protective layer and having a fourth water absorptivity substantially equal to said first water absorptivity, a second thickness different from the first thickness, and a fourth swelling rate substantially equal to said first swelling rate.

2. An information recording medium as set forth in claim 1, wherein said substrate and said hygroscopic swelling layer are made of polycarbonate resin.

3. An information recording medium as set forth in claim 1, wherein said hygroscopic swelling layer is made of ultraviolet ray-setting resin.

4. An information recording medium as set forth in claim 1, further comprising a second hygroscopic swelling layer formed under said substrate, wherein the second hygroscopic swelling layer is light transmissive and has a swelling rate substantially equal to the first swelling rate.

5. An information recording medium as set forth in claim 1, wherein said substrate and said hygroscopic swelling layer are made of the same material.

6. An information recording medium as set forth in claim 1, wherein the hygroscopic swelling layer has a thickness of less than 200 μm.

7. An information recording medium as set forth in claim 1, wherein the substrate is made of polycarbonate resin and the hygroscopic swelling layer is made of thermosetting resin.

8. The information recording medium of claim 1, wherein the thickness of the hygroscopic swelling layer is between 0.1 and 0.2 millimeters and the ratio of the water content in saturation of the hygroscopic swelling layer to the water content in saturation of the substrate is greater than 1 and less than 10.

9. The information recording medium of claim 1, wherein the first and second protective layers are formed of a material including the element silicon.

10. An information recording medium as set forth in claim 1, wherein said substrate is a plastic substrate.

11. An information recording medium as set forth in claim 1, wherein said hygroscopic swelling layer is made of thermosetting resin or plastic.

12. An information recording medium as set forth in claim 1, wherein said first and second protective layers are made of a SiNx layer, and said recording layer is made of a TbFeCo layer.

13. The information recording medium of claim 1, wherein the medium is a disk and the recording layer is an optical recording layer.

14. The information recording medium of claim 1, wherein the medium is a disk and the recording layer is a magneto-optical recording layer.

15. An information recording medium comprising:

a substrate having a first water absorptivity, a first thickness and a first swelling rate;

a first protective layer formed on said substrate and having a second water absorptivity such that the first protective layer is substantially resistant to absorption;

a re-writable recording layer formed on said first protective layer for recording information and including a rare-earth transition metal and capable of corrosion when in contact with moisture;

a second protective layer formed on said recording layer and having a third water absorptivity such that the second protective layer is substantially resistant to absorption; and a hygroscopic swelling layer formed on said second protective layer and having a fourth water absorptivity substantially equal to said first water absorptivity, a second thickness different from the first thickness, and a fourth swelling rate substantially equal to said first swelling rate;

wherein said first and second protective layers are made of a SiNx layer, and said recording layer is made of a TbFeCo layer.

16. An information recording medium as set forth in claim 15, wherein said substrate is a plastic substrate.

17. An information recording medium as set forth in claim 15, wherein said substrate and said hygroscopic swelling layer are made of the same material.

18. An information recording medium as set forth in claim 15, wherein said hygroscopic swelling layer is made of thermosetting resin or plastic.

19. An information recording medium as set forth in claim 18, wherein said hygroscopic swelling layer is made of ultraviolet ray-setting resin.

20. An information recording medium as set forth in claim 15, wherein the hygroscopic swelling layer has a thickness of less than 200 μm.

21. An information recording medium as set forth in claim 15, wherein said substrate and said hygroscopic swelling layer are both made of polycarbonate resin.

22. An information recording medium as set forth in claim 15, wherein the substrate is made of polycarbonate resin and the hygroscopic swelling layer is made of thermosetting resin.

23. The information recording medium of claim 15, wherein the thickness of the hygroscopic swelling layer is between 0.1 and 0.2 millimeters and the ratio of the water content in saturation of the hygroscopic swelling layer to the water content in saturation of the substrate is greater than 1 and less than 10.

24. The medium of claim 15, wherein the substrate and the hygroscopic swelling layer each have the same rate of water absorption.

25. The information recording medium of claim 15, wherein the medium is a disk and the recording layer is an optical recording layer.

26. The information recording medium of claim 15, wherein the medium is a disk and the recording layer is a magneto-optical recording layer.

27. An information recording medium as set forth in claim 15, further comprising a second hygroscopic swelling layer formed under said substrate, wherein the second hygroscopic swelling layer is light transmissive and has a swelling rate substantially equal to the first swelling rate.

28. The recording medium of any of claims 1, 15, 25 or 26 wherein the thickness of the substrate is about 1.2 millimeters and the thickness of the hygroscopic swelling layer is between about 0.1 millimeters and 0.2 millimeters.

* * * * *